BEST AVAILABLE COPY

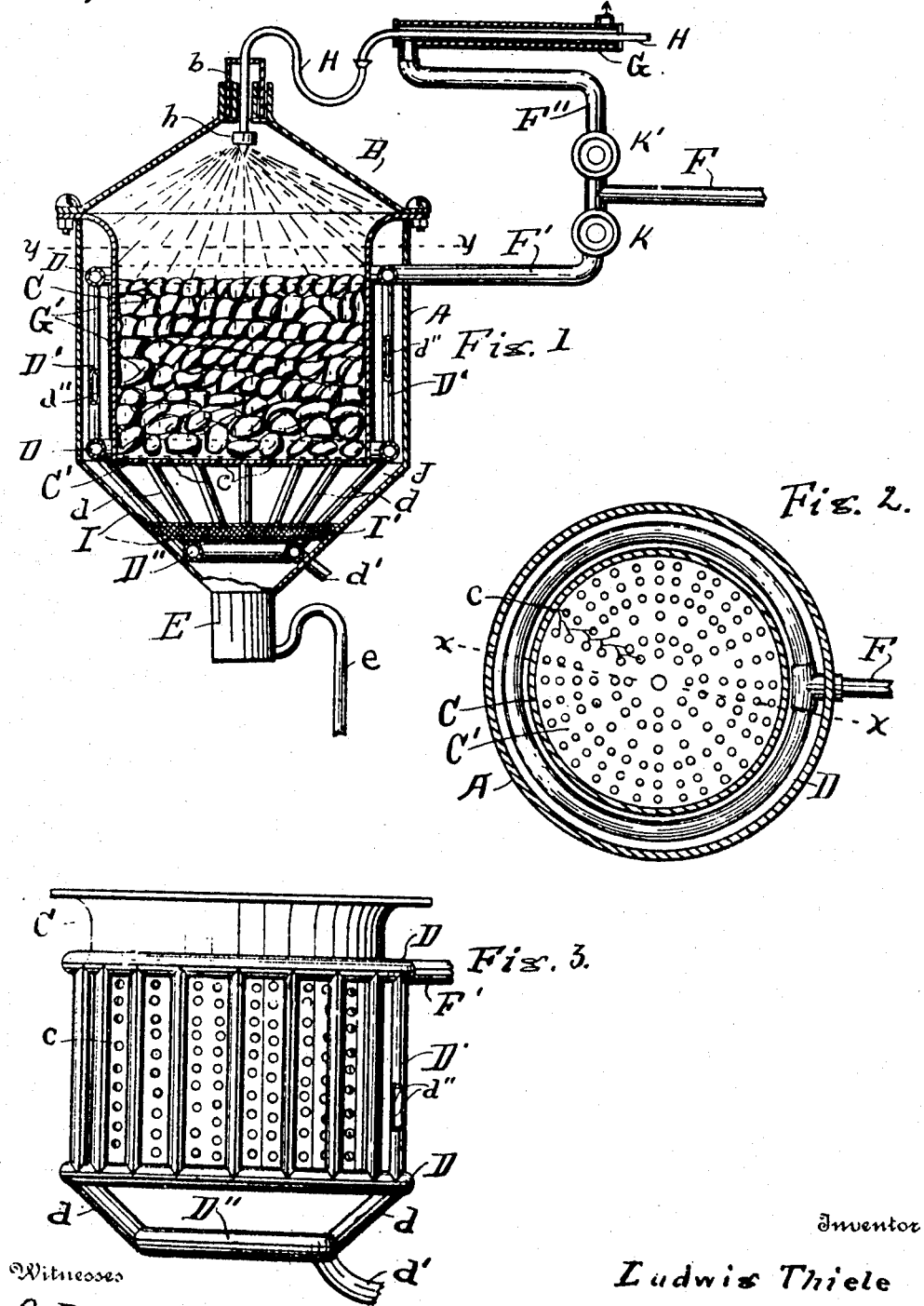

UNITED STATES PATENT OFFICE.

LUDWIG THIELE, OF HOLLAND, MICHIGAN.

APPARATUS FOR MANUFACTURING GLUE.

989,826.

Specification of Letters Patent.  Patented Apr. 18, 1911.

Application filed October 3, 1910. Serial No. ......

*To all whom it may concern:*

Be it known that I, LUDWIG THIELE, a subject of the King of Prussia and Emperor of Germany, residing at Holland, in the county of Ottawa and State of Michigan, have invented certain new and useful Improvements in Apparatus for Manufacturing Glue, of which the following is a specification.

My invention relates to improvements in the manufacture of gelatin and glue, and its objects are: first, to provide a means whereby the gelatin may be extracted from the raw material and made in much less time and at much less expense than by any of the methods now in use for its manufacture; second, to provide a means whereby the product will be rendered much stronger and more tenacious than by the processes now in use, and, third, to provide a means whereby the product may be bleached while in process of manufacture. I attain these objects by the mechanism illustrated in the accompanying drawing in which—

Figure 1 is a sectional elevation of the extracting or cooking tanks practically on the line *x x* of Fig. 2. Fig. 2 is a sectional plan of the same on the line *y y* of Fig. 1, and Fig. 3 is an elevation of the steam coils and the extracting tank, with the outside tank removed.

Similar letters refer to similar parts throughout the several views.

In the construction of the appliances for extracting the gelatin or glue from the raw material, I provide a tank A, which is provided with a water tight cover B that has a water, air and steam tight cap *b* at the apex for the passage of the water pipe H into the tank A, substantially as shown in Fig. 1. Inside of this tank I place a cage C which acts as a receptacle for the raw material G', from which the gelatin or glue is to be extracted. This cage is finely perforated both through the side walls and the bottom, as shown at *c* in Figs. 2 and 3, so that steam that is discharged through the pipes D, as indicated at *d''*, may thoroughly permeate every section of the raw material G' to reduce it to a jelly in the shortest possible period of time. I prefer that the cage or receptacle be made of aluminum, as this metal has the property of averting the danger of discoloring the product while in the process of being extracted.

I provide two distinct means for heating the raw material for the purpose of reducing it to a jelly in the process of converting it into gelatin or glue. First, I pass a pipe H through a steam heater G and into the top of the tank A, through a cap *b* at the apex of the cover B. I place a sprayer *h* on the end of this pipe inside of the tank A and force water through the pipe under high pressure so that it will be distributed over the top of the material in a very fine strong spray, as indicated in Fig. 1. The water is raised to nearly or quite the boiling point before being forced through the pipe H, and is superheated by a strong flow of live steam from the pipes F F'' into and through the heater G, so that the pipe is wholly surrounded and thoroughly heated thereby. The second means for heating the material consists of passing live steam through the pipes F and F' into the coils D, D, D' between the outer and the inner tanks. The connecting pipes D' in the coils are finely perforated through the sides next to the cage so that the live steam is thrown against the surface of the cage and through the apertures in the walls thereof, in direct contact with the material G'. The remaining steam in the coil, as it condenses, is allowed to flow through the drain pipe after having passed through the pipes of the lower circular pipe D''. The passage of steam through the pipe D'' will keep the jelly warm so that it will flow freely from the filter into the receptacle E and out through the pipe *e* to any desired storage receptacle.

As the material G' is reduced to the jelly state, it flows through the small apertures *c* through the walls and bottom of the cage, into the chamber J, below, where its high temperature is retained by the passage of the condensed water through the circular pipe D'', and the connecting pipe *d*, so that it may pass freely through the filtering element I' that is held between the plates I I, as shown in Fig. 1, and thence out through the settling basin E and the curved drain pipe *e*.

When I desire to bleach the gelatin or glue before straining it through the filter *i'*, I saturate the animal matter G' with a bleaching compound or chemical, and pass another chemical solution through the pipe H so that it is sprayed through the sprayer *h* upon the material G', the same as the spraying of hot water as hereinbefore described, thus applying the bleaching element at the most effective time, that is, when the gelatin or glue is in its nascent state or being extracted from the animal matter.

For the purpose of regulating the flow of steam to and through the pipes F' and F'', I place a valve, as K and K', in these pipes each side of the pipe F, that may be opened and closed at pleasure, and each independent of the other, so that steam may be entirely shut off from either or both of these pipes, or may be allowed to flow with full force through either or both, or the strength of the flow may be regulated to be forcible or weak through either or both of said pipes to govern the temperature of the material in the tank.

What I claim as new, and desire to secure by Letters Patent of the United States, is:

1. In a device for rendering animal matter to a jelly preparatory to making gelatin and glue, a steam tight tank, a cage finely perforated through the walls and bottom, a water pipe leading into the tank, a spraying device attached to the end of the said water pipe, a steam coil surrounding the cage, said coil arranged to discharge fine sprays of steam, a steam heater around a portion of the water pipe, and a steam pipe leading to the steam coil and the steam heater.

2. In combination with a steam tight tank and a perforated cage, a steam coil surrounding the cage, a hot water pipe leading into the tank, a superheating appliance connected with said pipe, a settling chamber below the cage, a filtering appliance below the settling chamber, means for heating the settling chamber, and means for drawing off the produced gelatin or glue liquid.

3. In an appliance for reducing animal matter to gelatin or glue, a steam tight tank, an inner perforated cage, a steam coil between the tank and cage, a steam heater, a water pipe passing through said heater, and into the tank, a spraying device on said pipe within the tank, a steam pipe leading to the steam coil and to the steam heater, shut off valves in the steam pipe between the steam heater on one side and the steam coil on the other side, a settling chamber including a filtering device below the cage, a receptacle below the filtering device for receiving the filtered substance from the cage, and a siphon for drawing off the contents of the receptacle.

Signed at Grand Rapids Michigan September 23, 1910.

LUDWIG THIELE.

In presence of—
I. J. CILLEY,
M. HEINZ.